Aug. 17, 1954     R. M. CAMPBELL     2,686,368
CALIPER GAUGE
Filed Dec. 1, 1949     2 Sheets-Sheet 1
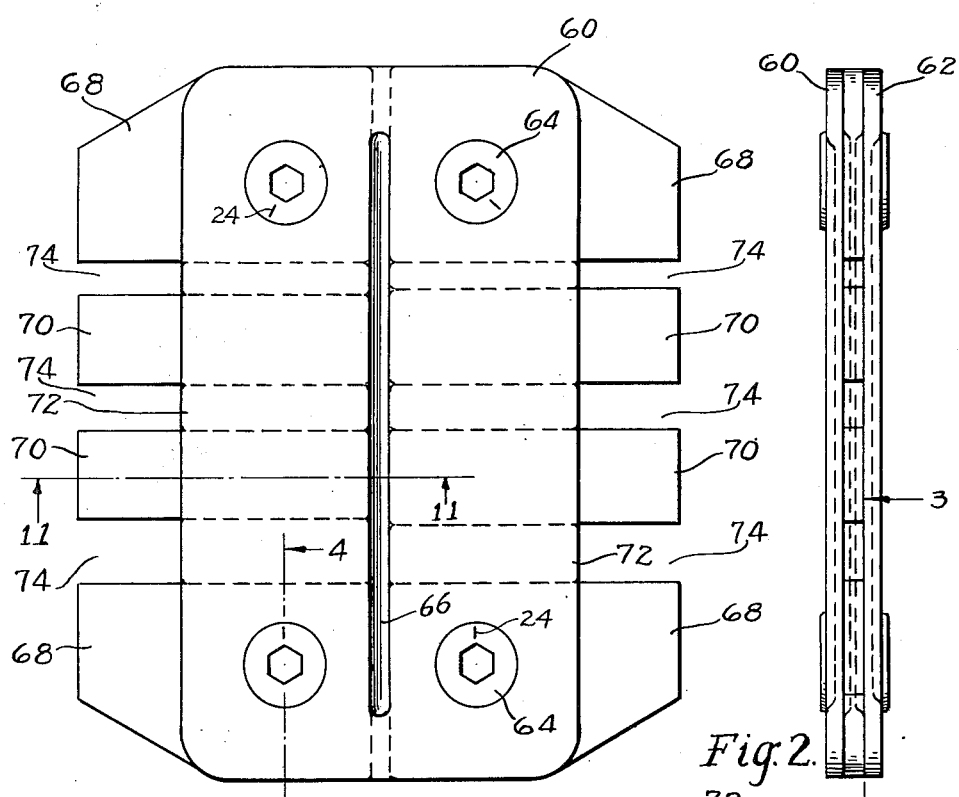
Fig. 1.
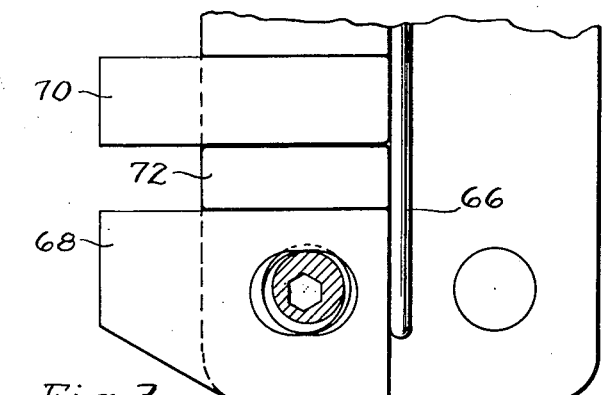
Fig. 2.
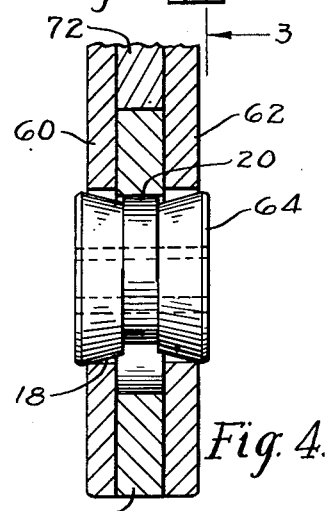
Fig. 4.
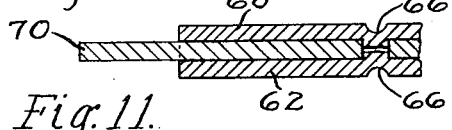
Fig. 3.
Fig. 11.
INVENTOR.
Roy M. Campbell
BY Charles Shepard
Attorney Aug. 17, 1954   R. M. CAMPBELL   2,686,368
CALIPER GAUGE Filed Dec. 1, 1949   2 Sheets-Sheet 2

INVENTOR.
BY  Roy M. Campbell
Charles Shepard
Attorney

Patented Aug. 17, 1954

2,686,368

UNITED STATES PATENT OFFICE 2,686,368

CALIPER GAUGE

Roy M. Campbell, Brighton, N. Y.

Application December 1, 1949, Serial No. 130,429

9 Claims. (Cl. 33—168)

The present invention relates to machinists' tools and more particularly to precision gauges of the caliper type as used by mechanics and inspectors to test the thickness of flat, cylindrical, or other shapes of materials or the distances between opposite surfaces in various situations. Opposed contact surfaces of the gauge are separated by a slot-like opening of precise width ground and polished to a usual accuracy of a thousandth of an inch or less. Such slotted instrument, in use, is dropped lightly over the edge of a plate or of a cylindrical shaft, for instance, to test thickness and diameter.

A familiar form of such gauges is the "Go" and "No-Go" type which requires the provision of two slots, one slightly wider than the other, for the purpose of establishing a tolerance in a given dimension of the work piece which renders the latter acceptable even though the dimension is inexact within certain limits. Thus, with a tolerance of 10 thousandths, one slot might be 225 thousandths wide (the "Go") and the other 215 thousandths wide (the "No-Go"). If the former passes over the work piece but the latter does not, it is within the tolerance and hence acceptable; but if neither passes, the piece is too large while, by the same token, if both pass over, it is too small and is rejected or corrected in either case.

This invention has for its general object to provide a simple, strong, convenient, and efficient gauge of the general character outline, both the manufacture and intended manipulation of which lend themselves to the attainment of great accuracy in the proper setting of the contacting measuring surfaces or jaws.

A further object is to provide such a gauge in which, should the jaws become worn by use or mutilated by mistreatment, they may be readily disassembled and restored to their original perfection, or the same jaws may be easily converted to produce gauging slots of quite different scales of measurement or replaced, interchangeably, with other jaws having the same or different characteristics.

A still further object of the invention is to provide a multiple gauge in a single or unitary assembly having, within reason, any desired number of slots and jaws all possessing the foregoing attributes.

These and other desirable objects are accomplished by the construction disclosed as an illustrative embodiment of the invention in the following description and in the accompanying drawings forming a part hereof, in which:

Fig. 1 is a plan view of a machine gauge constructed in accordance with and illustrating one embodiment of the invention;

Fig. 2 is an edge or side view thereof;

Fig. 3 is a fragmentary view similar to Fig. 1 but with an overlying check plate removed and one of the clamping members shown in section on the line 3—3 of Fig. 2;

Fig. 4 is an enlarged detail section taken substantially on the line 4—4 of Fig. 1;

Fig. 11 is a fragmentary section taken substantially on the line 11—11 of Fig. 1;

The same reference numerals throughout the several views indicate the same parts.

Referring more particularly to the drawings and first to the simpler embodiment shown in Figs. 5 to 9, 2 and 4 indicate a pair of identical cheek plates or frame plates, laterally separated, but superposed in outline upon each other and provided with registering circular openings 6 in rectangular distribution as shown, there being four openings in each plate. Confined between the cheek plates or frame plates are two identical flat gauge plates or clamping bars 8 and 10, and between them a third gauge plate or master bar 12 of the same thickness. The outer gauge plates (or clamping bars 8 and 10) have two identical openings 14 alined with the openings 6 in the frame plates. These openings 14, though semi-circular at their ends, are elongated in a direction lengthwise of the bars, as clearly appears in Fig. 7.

Figures 5, 6:
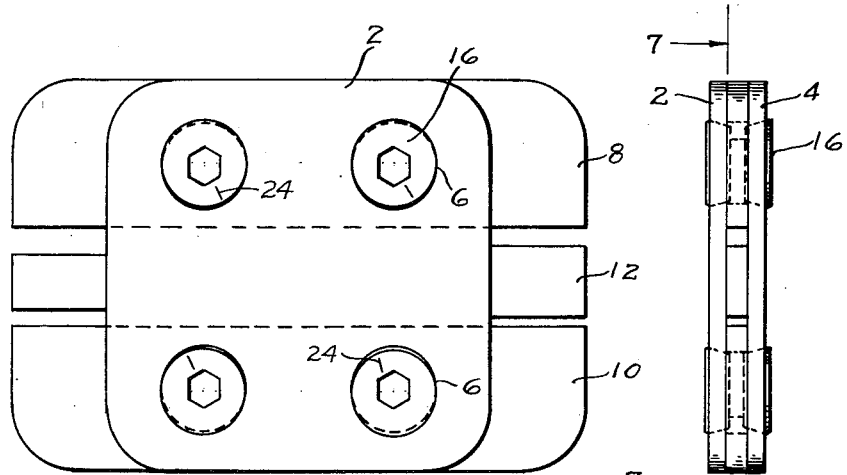
Fig. 5 is a plan view of another simpler embodiment of the invention.
Fig. 6 is a side or edge view thereof.

A clamping element 16, freely insertable and removable as hereinafter explained, occupies each group of registering or alined openings 6 and 14 in the two frame plates 2—4 and the outer two confined clamping plates 8 and 10 that are held between them and this clamping element extends entirely through all of the said parts. It is shown in detail in Figs. 8 and 9. It consists of a spool-like structure, its ends or flanges 18 being in the form of inwardly tapered truncated cones, and its central portion 20 being cylindrical but eccentric to the axis of the conical ends, so as to constitute an intermediate cam surface. Extending entirely through the spool is a wrench socket 22, by means of which this spool-like clamping member may be rotated with the familiar "Allen" wrench. But while this eccentric cam itself is of smaller radius than the cones 18, its high point (indexed at 24 on the end of the spool), reaches their radius though in a transverse plane which permits it to make contact only with an edge of one of the slots 14 in one of the outer gauge plates or clamping plates 8 and 10. Each clamping spool is long enough to have its conical ends project slightly beyond the outer surfaces of the respective frame plates 2—4 (as seen in Fig. 6) and bring the cones themselves in contact with the walls of the openings 6 when the said cones are displaced slightly laterally. The proportions are such that, on their overall diameter, they have scant clearance in passing through the openings. This appears in Fig. 4, to be later described.

In assembling the parts as thus far described, the two outer gauge plates or clamping plates 8 and 10 are first placed between the cheek plates or frame plates 2 and 4 with the several sets of openings alined, and the several eccentric cam spools 16 are then dropped through the holes with the high points of their cams turned toward the direction of elongation of the slots 14 of the plates 8 and 10, the latter being momentarily displaced slightly inwardly to permit plenty of clearance for the spool ends and cam. Then the central gauge bar or master bar 12 is pushed endwise into place between the two clamping bars 8 and 10, first separating the clamping bars laterally from each other enough to permit entrance of the master bar between them. It may even be necessary to turn the cam spools 16 so that their high points are faced outwardly away from the master bar 12, to allow the clamping plates 6 and 8 to move a little farther away from each other, for easier entrance of the master bar between them.

When insertion of the master bar 12 has been completed, a wrench is inserted seriatim in all of the cam spools, and each is turned a partial revolution so as to wedge the high points of the respective cams 20 against the inner edges (closest to the master bar 12) of the elongated slots 14 in the clamping plates 8 and 10, thus forcing them inwardly to clamp the central gauge plates or master bar 12 rigidly and firmly between them. One outer clamping plate thus acts as an ultimate stop for the other as a clamping reaction to squeeze the bar; at the same time that the cams 20 react inwardly against the clamping plates 8 and 10, the conical flanges on the spools 16 react outwardly against the edges of the holes in the frame plates 2 and 4, and because of the incline of the conical edges, this reaction tends to draw the frame plates 2 and 4 laterally toward each other and holds them tight against the side faces of the interposed members 8, 10, and 12.

Figure 7:
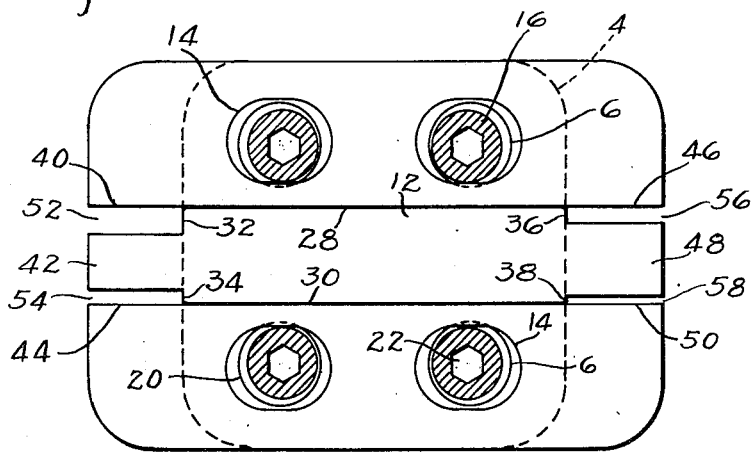
Fig. 7 is a section taken substantially on the line 7—7 of Fig. 6.
Figure 10:
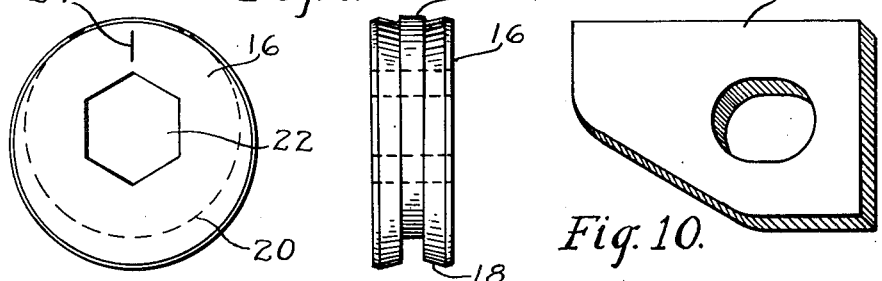
Fig. 10 is a perspective view of one of the jaws in detail.
Figures 8, 9:
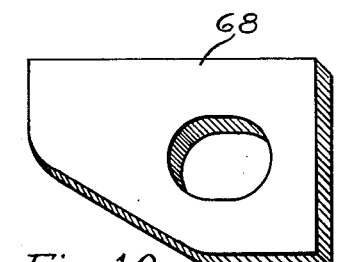
Fig. 8 is an enlarged plan view of one of the clamping elements alone.
Fig. 9 is an edge view thereof.

The actual work contacting surfaces of the gauge are provided at suitable notches or openings formed between the master bar 12 and the clamping bars 8 and 10, at the ends where they project beyond the frame plates 2 and 4. The mutually contacting or abutting edges of the three plates as indicated at 28 and 30 in Fig. 7 are precision ground. The center bar or master bar 12 must be of precise width because it is notched at both ends on both sides as indicated at 32, 34, 36, and 38 to form, in conjunction with the projecting ends of outer plates 8—10, opposed gauging jaws 40, 42, 44, 46, 48, and 50, resulting in work receiving slots 52, 54, 56, and 58. Of the latter, the first and second might be a "Go" and "No-Go" pair on the same work piece dimension and the last two another pair, with, of course, the tolerance difference greatly exaggerated in the drawing. Both edge surfaces of the gauge jaws 42 and 48 are also precision ground.

It is obvious that the whole implement may be readily and quickly taken apart for regrinding of the jaws after wear, or for setting them over to quite a different gauging dimension, all by simply giving the cam spools a reverse turn with the wrench. Or the center bar 12 alone may be removed and another substituted having the same width of body but widely different notch dimensions 32, etc., for use with quite another set of dimensional specifications.

The other embodiment of the invention earlier referred to contemplates the provision of a more extensive series of gauging jaw units with modified means for converting or compensating for regrinding. Referring now more particularly to Figs. 1 to 4, 10, and 11, the major elements of cheek plates or frame plates 60 and 62 and the cam clamping spools 64 are much the same, the latter being identical throughout the showings of both embodiments of the invention in both form and action. However, there are a greater number of other plates interposed between the frame plates, and all of the gauge plates including the outer ones carrying the clamping spools are divided at the center, as it were, and there is a row or column of gauging jaws and slots at each end, one row being clamped by one pair of two opposed cam spools and the other by the other pair.

To this end the cheek plates are provided centrally with inwardly projecting stamped guiding ribs 66 on their under sides. These are abutted by outer sliding jaws 68 which serve as clamping members, and inner jaws or dividing bars 70, and somewhat shorter master bars or spacing members 72 separating the various dividing bars and clamping jaws from each other. These members all have their edges or proximate faces ground straight and parallel. Each clamping jaw 68 carries or is motivated by its individual cam spool 64 acting as before, to force the two opposed jaws 68 toward each other, thereby tightly clamping between them all of the interposed dividing bars 70 and master bars 72. Corresponding ends of all of the members 68, 70, and 72 on one side of the gauge abut against the rib guide 66. The members 68, 70, and 72 on one side of the rib 66 are removable and replaceable independently of those on the other side of the rib 66.

When the cam spools 64 are actuated precisely as before, each separate line (on opposite sides of the ribs) of alternated jaws and spacing blocks is clamped firmly together and locked to produce a series of gauge slots indicated generally at 74. In clamping, the cams at the right top and left bottom of the article when seen as in Fig. 1 are turned clockwise, and the cams at the left top and right bottom are turned counterclockwise to clamp them, so as to throw the members 68 firmly against the ribs 66. The dimension of each gauge slot is established and controlled by the thickness of the adjacent block or master bar 72. All contacting surfaces are, of course, precision ground or finished.

Fig. 4 shows clearly the clamping and locking action of the cam spools in both embodiments above described. When the cam makes contact with the intermediately arranged jaw or plate it forces the spool toward the opposite sides of its openings in the frame plates so that, the spool being longer than the combined thickness of all the plates, the frame plates meet the cones and are forced toward each other or inwardly and thus the whole assembly is locked together without the use of any other means. With a reverse turn of the wrench, all parts become loose so that they may readily be disassembled.

Instead of notching the master bar 12 in the first embodiment, to determine the size of the gauging apertures by the sizes of the notches, straight dividing bars may be used, spaced from each other by straight master bars or spacers, as in the second embodiment. This avoids the necessity of forming any notches. Conversely, the notch structure may be used, if desired, in the second embodiment.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. In a caliper gauge, the combination with a pair of flat, parallel, relatively movable frame members provided with a relatively intermediate stop, of a flat detachable gauging jaw slidable between the members, a second flat gauging jaw similarly arranged and adapted to edgewise form a gauging slot in conjunction with the first, and means acting and reacting between the frame members and the second jaw for clamping the removable jaw edgewise in rigid position between the stop and the second jaw and flatwise between the frame members.

2. A gauge constructed and functioning as in claim 1, in which the stop consists of a duplication of the second jaw also arranged between the frame members and provided with a duplicate of the clamping means.

3. A gauge constructed and functioning as in claim 1, in which the frame members and the second jaw are apertured in register and the clamping means embodies an integral spool having its ends turning in the frame members and its mid portion constituting a cam engaging the second jaw within its aperture.

4. A gauge constructed and functioning as in claim 3, in which the apertures in the frame members are circular, those in the second jaw are elongated, the spool ends are conical with inward taper, and the cam action tends to displace the spool laterally of its axis so that such conical ends interlock with the frame members and hold all of the parts together.

5. A gauge constructed and functioning as in claim 1, in which the detachable jaw consists of a bar having notches of different depths on both edges of its end providing gauging slots in conjunction with the second jaw and the stop, respectively.

6. A gauge constructed and functioning as in claim 1, in which the two jaws are separated by in intervening detachable insert block through which the clamping means operates and which defines the dimension of a gauging slot formed between the jaws.

7. A caliper gauge embodying in combination, a support including a pair of relatively movable parallel and flat frame members, a plurality of flat detachable and replaceable plates slidable between said frame members and arranged in parallelism thereon with their ends projecting from the support to constitute gauging jaws, two of said plates having edges parallel to and spaced from each other and an intermediate jaw having at least two edge notches of different depths forming between them a plurality of gauging slots, said intermediate jaw also being slidable between said members, and means including a stop intermediate between said two frame members for releasably clamping all of the plates and said intermediate jaw together and to the support with said intermediate jaw arranged edgewise in rigid position between said stop and the second gauging jaw and flatwise between said frame members.

8. A gauge comprising two separate frame plates arranged substantially parallel to each other in laterally spaced relationship, a plurality of gauging jaws and spacer members between said frame plates, certain of which gauging jaws project endwise beyond the edges of said frame plates and have, in their projecting portions, gauging edges spaced from each other to define gauging slots between them, and cam means associated with said frame plates and rotating on axes transverse thereto for holding said jaws and spacer members tightly against each other.

9. A construction as described in claim 8, in which said cam means is provided with inclined surfaces operating to move said two frame plates toward each other into tight engagement with said gauging jaws and spacer members.

References Cited in the file of this patent

UNITED STATES PATENTS

| Number | Name | Date |
| --- | --- | --- |
| 845,899 | Roehm | Mar. 5, 1907 |
| 2,019,359 | Oswin | Oct. 29, 1935 |
| 2,105,054 | Posthuma | Jan. 11, 1938 |

FOREIGN PATENTS

| Number | Country | Date |
| --- | --- | --- |
| 394,663 | Great Britain | June 28, 1933 |
| 229,868 | Switzerland | Feb. 16, 1944 |
| 602,637 | Great Britain | May 31, 1948 |
| 263,690 | Switzerland | Dec. 1, 1949 |

OTHER REFERENCES

Kaden (publication), American Machinist, January 30, 1947, page 111. (Copy in library.)